(12) United States Patent
Tripp et al.

(10) Patent No.: US 9,177,143 B2
(45) Date of Patent: Nov. 3, 2015

(54) PROGRESSIVE STATIC SECURITY ANALYSIS

(71) Applicant: International Business Machines Corporation, Armonk, NY (US)

(72) Inventors: Omer Tripp, Har-Adar (IL); Marco Pistoia, Amawalk, NY (US); Salvatore A. Guarnieri, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 135 days.

(21) Appl. No.: 13/896,761

(22) Filed: May 17, 2013

(65) Prior Publication Data

US 2014/0344938 A1 Nov. 20, 2014

(51) Int. Cl.
*G06F 21/57* (2013.01)
*G06F 21/56* (2013.01)

(52) U.S. Cl.
CPC ............ *G06F 21/562* (2013.01); *G06F 21/563* (2013.01); *G06F 21/577* (2013.01)

(58) Field of Classification Search
CPC .... G06F 21/562; G06F 21/563; G06F 21/577
See application file for complete search history.

(56) References Cited

U.S. PATENT DOCUMENTS

| | | |
|---|---|---|
| 7,574,740 B1 | 8/2009 | Kennis |
| 7,617,489 B2 * | 11/2009 | Peyton et al. ................. 717/133 |
| 7,926,113 B1 | 4/2011 | Gula et al. |
| 2002/0078368 A1 * | 6/2002 | Yann et al. ..................... 713/200 |
| 2004/0181684 A1 * | 9/2004 | Hong et al. .................... 713/200 |
| 2007/0186285 A1 | 8/2007 | Hurst et al. |
| 2008/0189686 A1 * | 8/2008 | Rajan et al. .................... 717/125 |
| 2009/0259989 A1 * | 10/2009 | Cifuentes et al. ............. 717/110 |
| 2010/0235917 A1 | 9/2010 | Ku et al. |
| 2011/0138469 A1 | 6/2011 | Ye et al. |
| 2012/0054724 A1 | 3/2012 | Kalman et al. |
| 2013/0081002 A1 | 3/2013 | Kalman et al. |

OTHER PUBLICATIONS

Campos, S. et al.; "Selective Quantitative Analysis and Interval Model Checking Verifying Different Facets of a System"; Semiconductor Research Corporation & DARPA/CMO, Contract MDA972-90-C-0035; Apr. 20, 1999.

(Continued)

*Primary Examiner* — Gilberto Barron, Jr.
*Assistant Examiner* — Arya Golriz
(74) *Attorney, Agent, or Firm* — Harrington & Smith

(57) ABSTRACT

A disclosed method includes determining modifications have been made to a program and deriving data flow seeds that are affected by the modifications. The method includes selecting one of the data flow seeds that are affected by the modifications or data flow seeds that are not affected by the modifications but that are part of flows that are affected by the modifications and performing a security analysis on the program. The security analysis includes tracking flows emanating from the selected data flow seeds to sinks terminating the flows. The method includes outputting results of the security analysis. The results comprise one or more indications of security status for one or more of the flows emanating from the selected data flow seeds. At least the deriving, selecting, and performing are performed using a static analysis of the program. Apparatus and program products are also disclosed.

10 Claims, 7 Drawing Sheets

(56) References Cited

OTHER PUBLICATIONS

Giannakopoulou, D.; "Model Checking for Concurrent Software Architectures"; Imperial College of Science, Technology and Medicine, Department of Computing, University of London; Thesis for Doctor of Philosophy; Jan. 1999.

Visser, W, et al.; "Model Checking Programs"; Ames Research Center, Moffet Field, CA, 2002 Kluwer Academic Publishers, Netherlands; Apr. 19, 2002.

Anonymous; "Deterministic Compilation of Safety Linear Temporal Logic Formulas for Efficient Model Checking"; http://www.ip.com/pubview/IPCOM000142186D; Oct. 24, 2006.

IBM TDB; "(PF/ASIC/DS) An efficient and comprehensive model to represent chip, package and system components that effect signal quality": http://www.ip.com/pubview/IPCOM000014381D; Jun. 19, 2003.

* cited by examiner

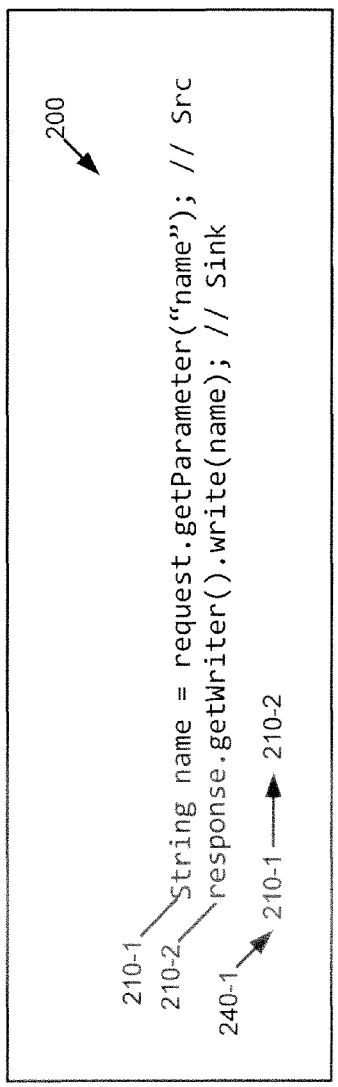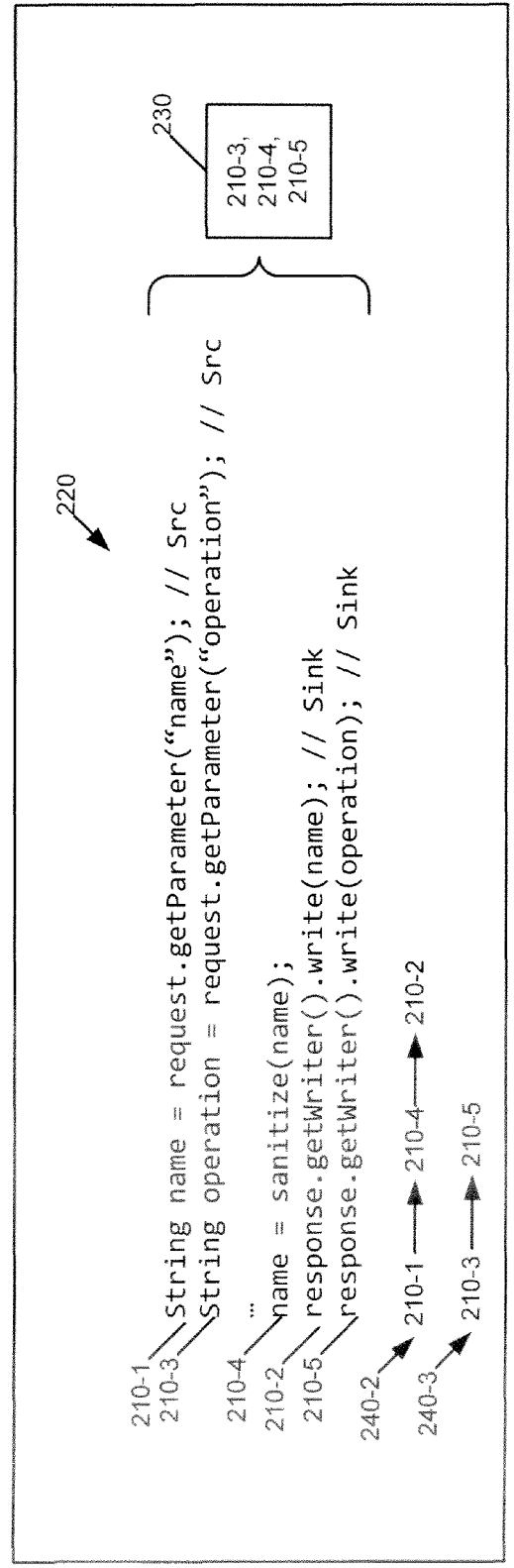
FIG. 2A
FIG. 2B

UI 180

Using new data flow seeds:

Flow from request.getParameter("operation") (line X+1) to response.getWrite("operation") (line Y+1) is not sanitized and is a possible security violation Perform additional analysis using unmodified data flow seeds but with modified flows?

510 — Yes    No — 515

Using unmodified data flow seeds but with modified flows:

Flow from request.getParameter("name") (line X) to response.getWrite("name") (line Y) is sanitized by sanitize(name) (line Y-1)

FIG. 5C

PROGRESSIVE STATIC SECURITY ANALYSIS

BACKGROUND

This invention relates generally to analysis of program code and, more specifically, relates to static analysis of program code.

This section is intended to provide a background or context to the invention disclosed below. The description herein may include concepts that could be pursued, but are not necessarily ones that have been previously conceived, implemented or described. Therefore, unless otherwise explicitly indicated herein, what is described in this section is not prior art to the description in this application and is not admitted to be prior art by inclusion in this section.

Static analysis is an analysis that involves examining the code of programs such as Web programs without executing the code of the program. Some type of model is (or, more typically, models are) created of the code of the program, to estimate what would happen when the code actually is executed.

Static security analysis generally takes the form of taint analysis, where the analysis may be parameterized by a set of security rules, each rule being a triple <Src,San,Snk> denoting the following:

1) source statements (Src) reading untrusted user inputs;
2) downgrader statements (San) endorsing untrusted data by either endorsing or sanitizing the untrusted data; and
3) sink statements (Snk) performing security-sensitive operations.

There are a number of techniques for analyzing taint flow from sources to sinks. These techniques also consider whether flow passed through a downgrader (also called an endorser or sanitizer for endorsement or sanitization, respectively) that performs downgrading of the taint. One set of techniques includes graphs such as call graphs. Call graphs are directed graphs that represent calling relationships between methods in a computer program.

Using such techniques, given security rule r, a flow from a source in $Src_r$ to a sink in $Snk_r$ that does not pass through a downgrader from $San_r$ comprises a potential vulnerability.

One of the biggest advantages of static security analysis, compared to black-box security testing, is that static security analysis can become an integral part of the development process: The analysis can be run on a system that is not in a deployable state (e.g., because of missing code, errors, or inability to run the system on the given hardware resources), and also runs significantly faster than a black-box scan and without the need to configure the analysis.

Although static security analysis has many benefits, the analysis may still be improved.

BRIEF SUMMARY

The following summary is merely intended to be exemplary. The summary is not intended to limit the scope of the claims.

A disclosed method includes determining modifications have been made to a program and deriving data flow seeds that are affected by the modifications. The method includes selecting one of the data flow seeds that are affected by the modifications or data flow seeds that are not affected by the modifications but that are part of flows that are affected by the modifications and performing a security analysis on the program. The security analysis includes tracking flows emanating from the selected data flow seeds to sinks terminating the flows. The method includes outputting results of the security analysis. The results comprise one or more indications of security status for one or more of the flows emanating from the selected data flow seeds. At least the deriving, selecting, and performing are performed using a static analysis of the program. Apparatus and program products are also disclosed.

BRIEF DESCRIPTION OF THE SEVERAL VIEWS OF THE DRAWINGS

FIG. 2A is a snippet of a program used as an example;

FIG. 2B is a modified version of the snippet of the program in FIG. 2A;

FIGS. 5A, 5B, and 5C are examples of presentation of security analysis results on a user interface.

DETAILED DESCRIPTION

As stated above, there are problems with static security analysis. Additional description of problems is now presented.

One exemplary problem is that in each scan, the static security analysis considers the entire program scope from scratch. This creates a lot of redundancy—and thus wasted analysis work, resulting in slow response time—especially if the code changes between two consecutive scans are relatively minor. This is often the case if the analysis is integrated into the development lifecycle, running, e.g., each time a commit is attempted. Regarding the term "commit", this terminology is used in the context of a distributed development environment. A commit is the act of publishing local changes to a main repository.

Several attempts have been made to solve the redundancy problem. These are collectively known as the problem of incremental analysis. The main limitation of traditional incremental-analysis techniques is that security analysis is modeled as a graph reachability problem, searching (as described above) for flows from source statements reading (untrusted) user input to sink statements performing security-sensitive operations, which requires reasoning about the transitive influence of source statements.

Thus, local code changes may have global effects, which seriously limit the ability to rescan the subject program efficiently given even a small number of code changes. The only known solution is a technique where the static security analysis breaks the subject scope into bounded neighborhoods surrounding source statements. This enables efficiency, but sacrifices the soundness of the analysis. Soundness means that there are no false negatives (i.e., missed vulnerabilities).

By contrast, the exemplary embodiments herein propose a novel variant of incremental static security analysis, which is referred to as progressive analysis herein. In an exemplary embodiment, a main idea is to rescan a program each time from scratch, similarly to the naïve approach, but the analysis diverges from the naïve approach by prioritizing the propagation of data-flow facts, such that new findings will be reported (e.g., earlier or later relative to old findings) during the scan, enabling fluent and efficient tracking of the security status of the program during its development. Data-flow facts are pieces of information that are followed from seeds (e.g., statements corresponding to sources), through flows, to sinks that use the data flow facts. The data-flow facts may be modified during this process.

Figure 1:
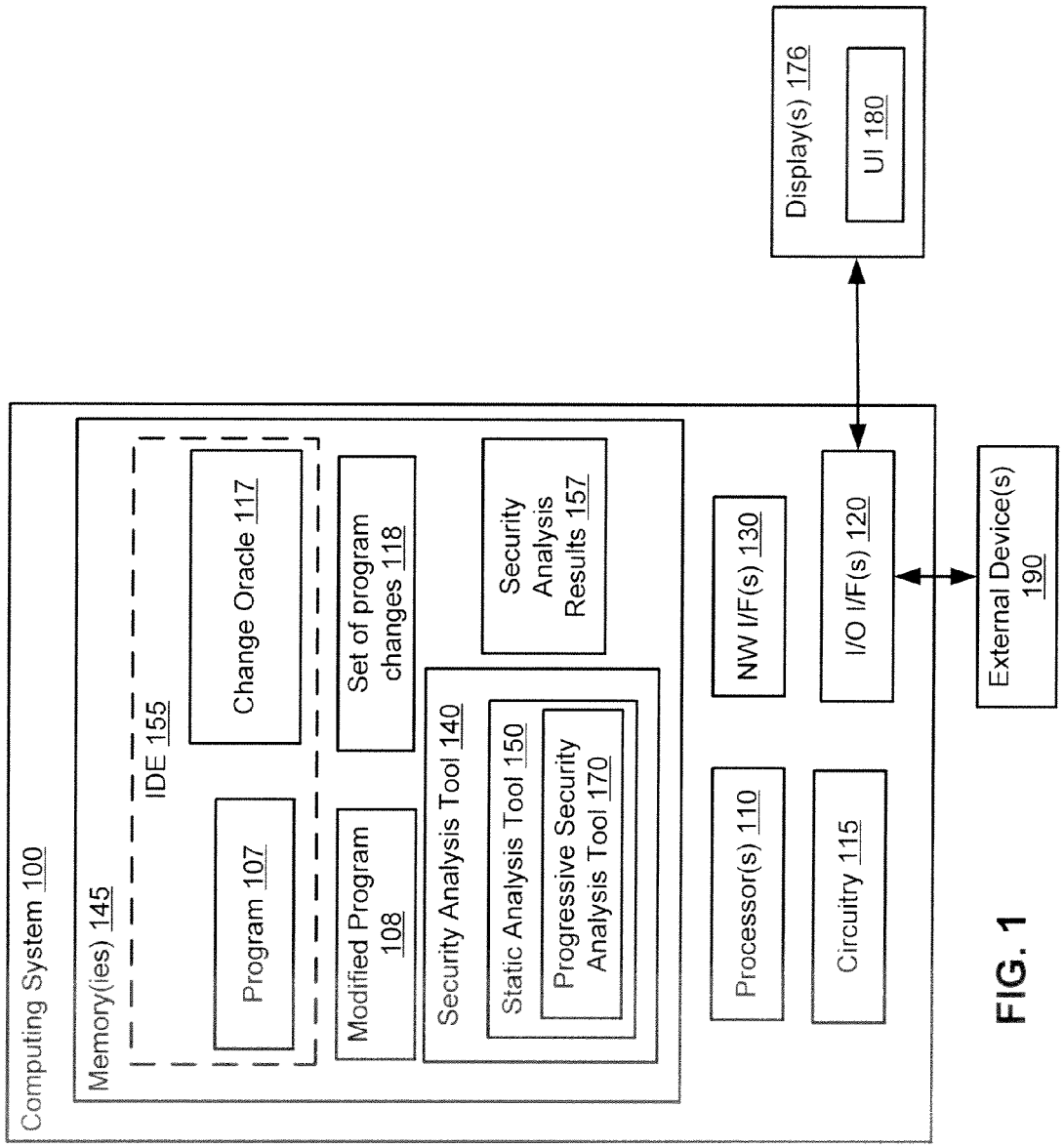
FIG. 1 is a block diagram of an example of a system suitable for performing the exemplary embodiments herein.

Referring to FIG. 1, this figure provides an overview of a computing system 100 suitable for use with exemplary embodiments herein. The computing system 100 comprises one or more memories 145, one or more processors 110, one or more interfaces 120, and one or more wired or wireless network interfaces 130. Alternatively or in addition to the one or more processors 110, the computing system 100 may comprise circuitry 115. The computing system 100 is coupled to or includes one or more displays 176 and one or more external device(s) 190. In one example, an IDE (integrated development environment) 155 provides a program 107 and a change oracle 117 in the one or more memories 345. The one or more memories 345 also include a set of program changes 118, security analysis results 157, and a security analysis tool 140 that includes a static analysis tool 150. The static analysis tool 150 includes a progressive security analysis tool 170. The security analysis tool 140, in an exemplary embodiment, is implemented computer-readable program code that is executable by the one or more processors 110 to cause the computing system 100 to perform one or more of the operations described herein. In another example, the operations may also be performed, in part or completely, by circuitry 115 that implements logic to carry out the operations. The circuitry 115 may be implemented as part of the one or more processors 110 or may be separate from the one or more processors 110. The processors 110 may be any processing units, such as digital signal processors and/or single-core or multi-core general purpose processors. The circuitry 115 may be any electronic circuit such as an application specific integrated circuit or programmable logic. The memories 145 may comprise non-volatile and/or volatile RAM (random access memory), cache memory, NAND-based flash memory, long term storage (e.g., hard drive), and/or read only memory. The one or more I/O interfaces 120 may include interfaces through which a user may interact with the computing system 100. The display(s) 376 may be a touchscreen, flatscreen, monitor, television, projector, as examples.

A user interacts with the security analysis tool 140 through the UI 180 on the display 175 in an exemplary embodiment or through the network interface(s) 130 in another non-limiting embodiment. The external device(s) 190 enable a user to interact in one exemplary embodiment with the computing system 135 and may include a mouse, trackball, keyboard, and the like. The network interfaces 130 may be wired or wireless and may implement a number of protocols, such as cellular or local area network protocols. The elements in computing system 100 may be interconnected through any technology, such as buses, traces on a board, interconnects on semiconductors, and the like.

Figure 6:
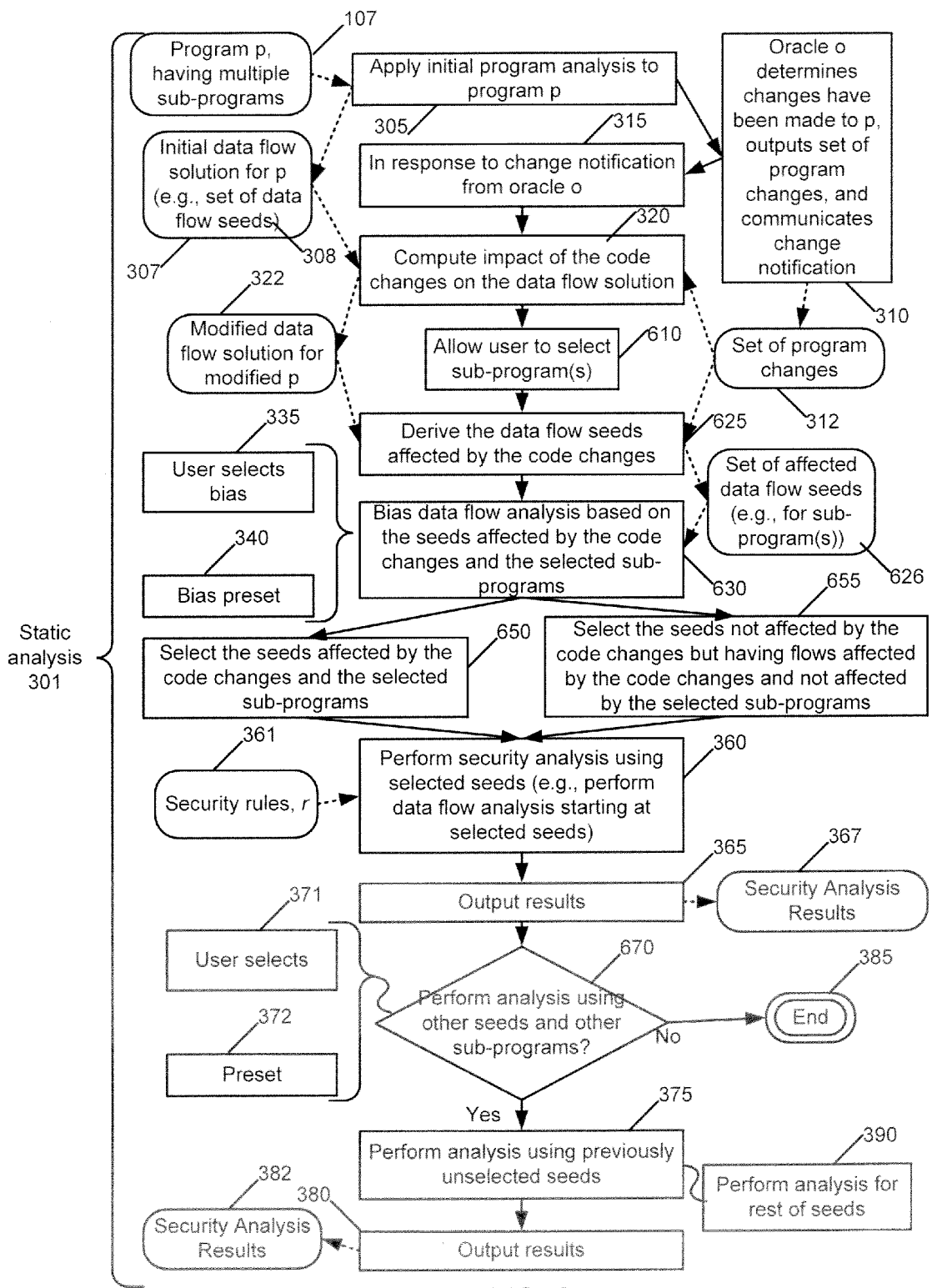
FIG. 6 is a logic flow diagram for progressive static security analysis, and illustrates the operation of an exemplary method, a result of execution of computer program instructions embodied on a computer readable memory, and/or functions performed by logic implemented in hardware, in accordance with exemplary embodiments.

In this example, the security analysis tool 140 includes a static analysis tool 150 that performs the static analyses operations (e.g., static analysis 301 described below in reference to FIGS. 3, 4, and 6). As an example, the static analysis tool 150 includes a progressive security analysis tool 170 that performs progressive static security analysis as described below. It is noted that the separation into static analysis tool 150 and progressive security analysis tool 170 is merely exemplary and for ease of description. Instead of this scenario, there could be simply a static analysis tool 150. Furthermore, there does not have to be a security analysis tool 140 (e.g., which could perform other analyses, such as runtime analyses) and a static analysis tool 150; instead, there could be only a static analysis tool 150.

In the example of FIG. 1, a user interacts with the IDE 155 and modifies the program 107. The change oracle 117 determines the user has modified program 107 and notifies the security analysis tool 140, e.g., via the progressive security analysis tool 170, of a set of program changes 118. The progressive security analysis tool then performs operations, as described in FIG. 3, using the set of program changes 118.

Figure 4:
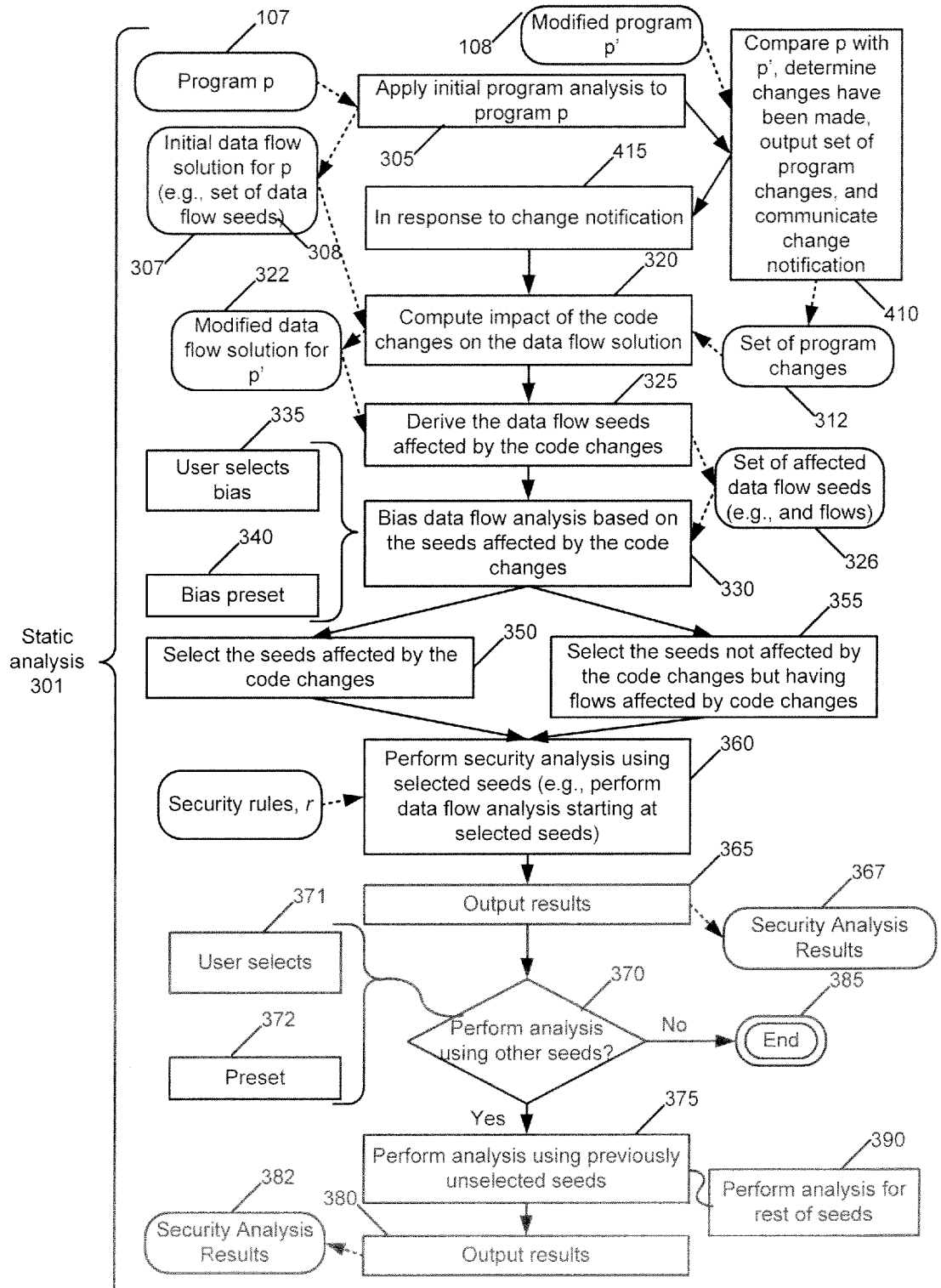

In another example, as illustrated in FIG. 4, the IDE 155 is not used and the progressive security analysis tool 170 compares the program 107 with a modified program 108 to create the set of program changes 118. The progressive security analysis tool then performs operations, as described in FIG. 4, using the set of program changes 118.

FIGS. 2A and 2B are used to illustrate an exemplary approach for progressive security analysis. FIG. 2A shows a snippet 200 of a program 107. FIG. 2B shows a snippet 220 after modifications have been made to the snippet 200. Depending on implementation, both snippets 200, 220 would be part of program 107, or snippet 200 would be part of program 107 and snippet 220 would be part of modified program 108. A comparison of the two snippets 200, 220 would determine that set of program changes 230 includes statements 210-3, 210-4, and 210-5. The comparison could be a simple line-by-line analysis that finds new statements or could be more complex, such as an analysis that finds moved sections of statements. For an IDE 155, the IDE 155 will "know", e.g., via the change oracle 117, that a user had made a change to the program 107, such as by monitoring additions, deletions, and movement of instructions.

Regarding snippet 200, this includes two statements 210-1 and 210-2. Snippet 200 contains a single vulnerability, due to the flow of the user-provided name value (from "name" input into the source, Src, request.getParameter) into a security-sensitive operation illustrated as a write operation in a sink, Sink. The response.getWriter( ).write(name) operation renders the value to a response HTML (hyptertext markup language). That is, the value in the string variable name is written into HTML.

FIG. 2A illustrates a simple flow 240-1 from statement 210-1 to statement 210-2. In terms of a call graph, this would be from the source request.getParameter("name") to the sink response.getWriter( ).write(name).

In an exemplary approach herein, after the initial scan and code change inserting the second set of statements 210-3, 210-4 and 210-5 (see FIG. 2B), the analysis explores the code in a way that biases new data-flow paths. This, in an exemplary embodiment, gives priority to the second seeding statement (request.getParameter("operation")), defining operation, over the first seeding statement defining name (request.getParameter("name")).

Similarly, the data-flow transition passing the value of the string variable operation into the second sink statement (statement 210-5) is prioritized over propagation steps (instructions 210-1, 210-4 and 210-2) involving the string variable name. FIG. 2B illustrates two simple flows 240-2 from statement 210-1 to statement 210-4 and then to statement 210-2. In terms of a call graph, this would be from the source request-.getParameter("name") to the sanitizer sanitize(name) and then to the sink response.getWriter( ).write(name). Another simple flow 240-3 is from statement 210-3 to statement 210-

5. In terms of a call graph, this would be from the source request.getParameter("operation") to the sink response.get-Writer( ).write(operation).

After the vulnerability related to the string operation (in statement 210-5) is discovered and reported to the user, the analysis returns to the string variable name, and finds that there is no longer a vulnerability caused by this value, because a sanitization step (in statement 210-4) has been introduced. Compare the original flow 240-1 with the modified flow 240-2. This type of biasing of the data flow analysis places emphasis on new flows 240 added to the program 107 via new statements 210. A user might use this type of biasing to determine whether newly added statements 210 are free from possible security violations.

Note that the prioritization may be reversed, such that the propagation steps (instructions 210-1, 210-4 and 210-2) involving the string variable name are prioritized over the data-flow transition passing the value of the string variable operation into the second sink statement (statement 210-5). This type of biasing of the data flow analysis places emphasis on old flows previously in the program 107 but possibly modified via new statements 210. A user might use this type of biasing to determine whether newly added statements 210 correct possible security violations in the "old" program 107.

For the user, the experience is quite smooth: Instead of waiting for the entire analysis to complete, asynchronous results are reported incrementally, and those related to recent code changes (or to code changes for what is primarily old code) are the first to arrive.

Figure 3:
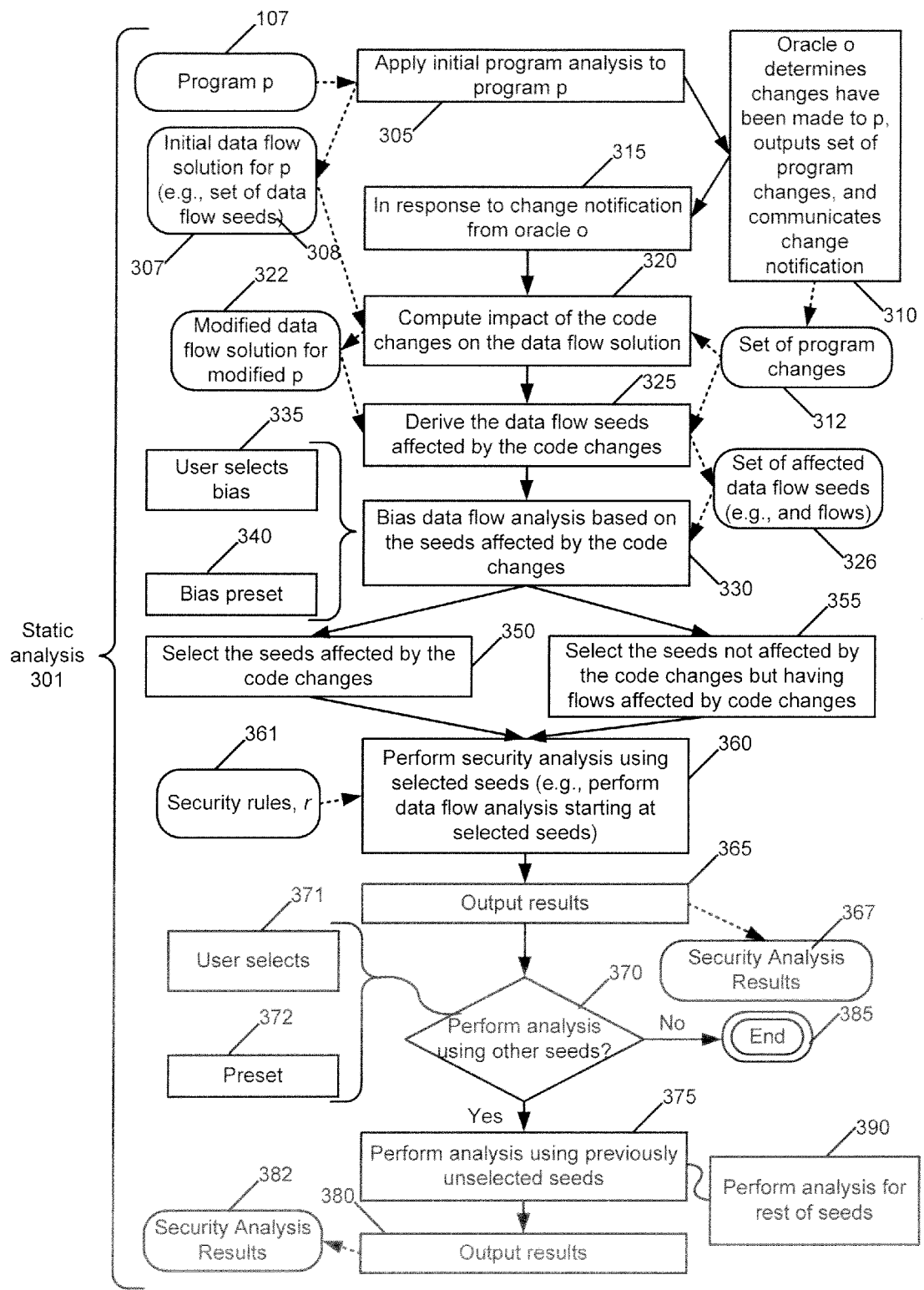
FIGS. 3 and 4 are logic flow diagrams for progressive static security analysis, and illustrate the operation of an exemplary method, a result of execution of computer program instructions embodied on a computer readable memory, and/or functions performed by logic implemented in hardware, in accordance with exemplary embodiments.

Referring to FIG. 3, this figure is a logic flow diagram for progressive static security analysis for an example using an IDE 155. FIG. 3 further illustrates the operation of an exemplary method, a result of execution of computer program instructions embodied on a computer readable memory, and/or functions performed by logic implemented in hardware, in accordance with an exemplary embodiment. The static analysis 301 in FIG. 3 is assumed to be performed by the static analysis tool 150 and primarily by the progressive security analysis tool 170.

In block 305, the static analysis tool 150 applies an initial program analysis to program p 107. The static analysis tool 150 determines an initial data flow solution 307 for p, which may include a set of data flow seeds 308 and other items such as a call graph. It should be noted that data flow seeds correspond to statements for sources and in FIG. 2A for instance the data flow seed is the statement 210-1. In block 310, the oracle o 117 determines that changes have been made to the program p 107, outputs a set of program changes 312, and communicates a change notification, e.g., to the static analysis tool 150. Typically, the oracle o 117 tracks any changes to the program p 107 made by a user, such as additions, deletions, and movement of instructions.

In response (block 315) for the change notification received from oracle o 117, the static analysis tool 150 computes (block 320) an impact of the code changes on the data flow solution 307 and creates a modified data flow solution 322 for the modified program p 107. For instance, a revised version of a call graph could be part of the modified data flow solution 322. The static analysis tool 150 uses both the initial data flow solution 307 and the set of program changes 312. In block 325, the progressive security analysis tool 170 derives the data flow seeds affected by the code changes and creates the set of affected data flow seeds 326. In the example of FIG. 2B, the data flow seed 326 corresponds to the statement 210-3. It is noted that element 326 may also include an indication of flows that are affected by the code changes but do not have seeds affected by code changes. For instance, the flow 240-2 shown in FIG. 2B does not have a seed (i.e., corresponding to statement 210-1) that is affected by code changes, but does have a flow that is affected by code changes, as the flow 240-2 now proceeds through statement 210-4, which is a modified code portion.

In block 330, the progressive security analysis tool 170 biases the data flow analysis based on the seeds affected by the code changes. In the example of block 335, a user is prompted to select whether the analysis should be biased in favor of new seeds (block 350) or in favor of old seeds (block 355) and the selection of blocks 350 or 355 is performed responsive to the response of the user. In the other example of block 340, the bias is preset to one of block 350 or 355. For instance, the progressive security analysis tool 170 could be programmed to select one block.

Block 350 is an example where the new seeds in the set of affected data flow seeds 326 will be selected first, and block 355 is an example where the old seeds not in the set of affected data flow seeds 326 but having flows that are affected by the code changes will be selected first. In block 360, the progressive security analysis tool 170 performs a security analysis based on the selected seeds and outputs the results in block 365 (e.g., to a memory 145 and/or to a UI 180) as security analysis results 367 (e.g., as part of security analysis results 157 of FIG. 1). The static security analysis in block 360 can use security rules, r, 361 as these rules are described above. It is noted the security analysis includes a data flow analysis that starts at the selected seeds.

It is possible for the flow in FIG. 3 to end at this point. For instance, if it is determined (e.g., by the progressive security analysis tool 170) that an analysis should not be performed for the unselected (i.e., other) seeds (block 370=No), the flow ends in block 385. It is also possible for the flow to continue such that an analysis is performed using the unselected seeds (block 370=Yes). Then, flow proceeds to block 375, where the progressive security analysis tool 170 performs an analysis using previously unselected seeds and outputs the results 382 (e.g., as part of security analysis results 157 of FIG. 1) in block 380 (e.g., to memory 145 and/or to a UI 180) as security analysis results 383. The analysis in block 375 should be a continuation of the analysis in block 360 (e.g., the results from the analysis in block 360 would be applied to the analysis in block 375). For instance, the same method might be used in both analyses in blocks 360 and 375, and any analysis based on that method performed for block 360 could be used for block 375. As an example, a mapping from input(s) to output(s) for methods is created so that each time the method is seen, the mapping is only created once. The mapping created in block 360 could be used in block 375. Alternatively, the analysis performed in block 375 could use none of the analysis from block 360.

Note that as shown in block 390, the analysis in block 375 may also include performing an analysis for the rest of seeds (which are those seeds not affected by code changes and not having flows affected by code changes). The performance of block 390 may be performed (or not performed) responsive to user input.

Whether to perform or not to perform the additional analysis using the previously unselected seeds may be determined by having a user select (block 371) between two options (one option to perform and one option not to perform the additional analysis using the previously unselected seeds) or via a preset (block 372) that chooses whether to perform or not to perform the additional analysis using the previously unselected seeds. Regarding the preset in block 372, this could be implemented in a variety of ways. The progressive security analysis tool 170 could be programmed to perform both analyses of blocks 350 and 355, performing block 350 first then performing block 355 (by performing block 375). In another example, a user could indicate that analyses using both blocks 350 and 355 will be performed until this preset is reset. Conversely, a user could indicate that only block 355 is to be performed (e.g., until there are no indicated security violations) or could indicate that only block 350 is to be performed (e.g., until there are no indicated security violations).

It is noted that reference 301 indicates that every block is part of the static analysis performed using a program. However, depending on implementation, this may not be the case. For instance, block 310 may be performed separately from a static analysis of a program. That is, block 305 may be performed at one point, and a user could make multiple modifications to the program p 107 over, e.g., several days. Block 310 could be performed, e.g., in response to an action by a user, such as by having the user select to perform a static analysis of the now modified program p 107. Blocks 315 and on then perform a static analysis of the modified program p 107.

It should be further noted that the outputting blocks 365 and 380 may be performed at least in part by outputting data over a network interface 130. As an example, the computing system 100 could be a server that performs the analysis in FIG. 3 (or FIG. 4) and the results 367, 382 are communicated to a user via a network. Furthermore, the outputting operations in blocks 365 and 380 may not technically be performed using a static analysis of the program p 107. That is, the static analysis of the program could be considered to be over when the results are output.

Turning to FIG. 4, this figure is a logic flow diagram for progressive static security analysis for an example without using an IDE 155. FIG. 4 further illustrates the operation of an exemplary method, a result of execution of computer program instructions embodied on a computer readable memory, and/or functions performed by logic implemented in hardware, in accordance with an exemplary embodiment. The static analysis 301 in FIG. 4 is assumed to be performed by the static analysis tool 150 and primarily by the progressive security analysis tool 170. Most of the blocks in FIG. 4 have been described and only the differences between FIGS. 4 and 3 are described herein.

Since there is no change oracle 117 to monitor changes to the program p 107, the progressive security analysis tool 170 is used in block 410 to compare a modified program p' 108 with the original program p 107 to determine the set of changes 312 that occur due to code changes to the original program p 107. In block 410, the progressive security analysis tool 170 determines changes have been made, outputs set of program changes 312, and communicates a change notification, e.g., to the static analysis tool 150. In response (block 415) to the change notification, the rest of the flow beginning at block 325 in FIG. 4 (and FIG. 3) is performed.

Figure 5A:
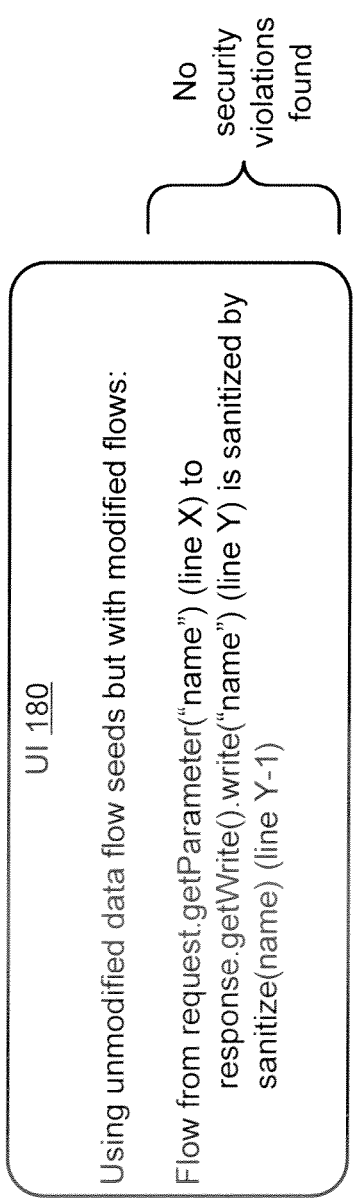
Figure 5B:
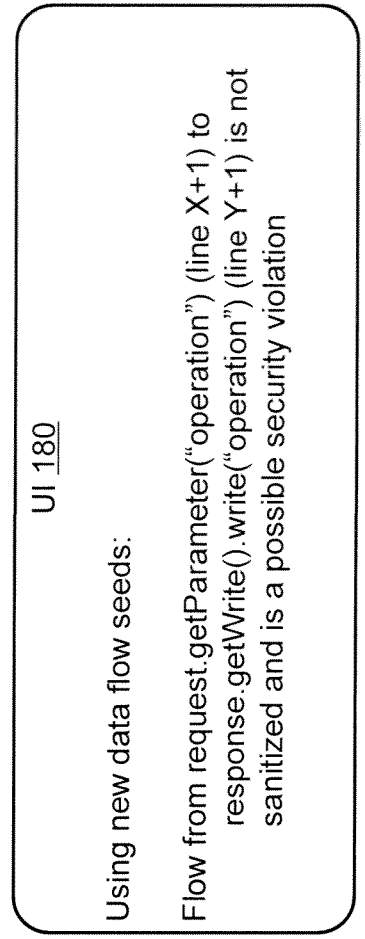

FIGS. 5A, 5B, and 5C are examples of presentation of security analysis results on a user interface. These examples specifically present security status for various flows and use the code snippet 220 of FIG. 2B. Turning to FIG. 5A, an example is shown presentation of security analysis results on a user interface 180. For this example, block 355 is performed to select the seeds not affected by the code changes and in block 370, another analysis is not performed using the other seeds, which in this case are the seeds affected by the code changes. That is block 370=No, and the flow ends in block 385. Thus, the statement 210-1 is a seed for the source request.getParameter("name"), and statements 210-4 and 210-2 are analyzed as part of a flow 240-2. The progressive security analysis tool 170 indicates that, using original data flow seeds, the flow from request.getParameter("name") (e.g., at line X) to response.getWrite( ).write("name") (e.g., at line Y) is sanitized by sanitize(name) (e.g., at line Y−1). Another option indicating security status of the seeds not affected by the code changes but having flows affected by codes changes is shown as "No security violations found". Such option may be used for any indications herein.

For FIG. 5B, an example is shown presentation of security analysis results on a user interface 180. For this example, block 350 is performed to select the seeds affected by the code changes and in block 370, another analysis is not performed using the other seeds, which in this case are the seeds not affected by the code changes. That is block 370=No, and the flow ends in block 385. Thus, the statement 210-3 is a seed for the source request.getParameter("operation"), and the statement 210-5 is analyzed as part of a flow 240-3. The progressive security analysis tool 170 indicates that, using new data flow seeds, the flow from request.getParameter("operation") (e.g., line X+1) to response.getWrite( ).write("operation") (e.g., line Y+1) is not sanitized and is a possible security violation.

FIG. 5C is an example where block 350 is performed and the seeds affected by the code changes are selected. Additionally, block 370=Yes and another analysis is performed for the seeds not previously selected (which are the seeds not affected by the code changes but having flows affected by code changes in this example). This examples shows the user was presented with text stating "Perform additional analysis using original data flow seeds?" and the user selected the choice "Yes" from button 510 and did not select the choice "No" from button 515. This simple example shows that once the user selects "Yes" using the button 510, the results are presented in the same UI. Note that another set of buttons could be used to also request from the user whether an analysis should be performed for the old seeds (those seeds not newly added in code changes or not having flows modified via code changes), and results for that analysis may be indicated should the user request the analysis be performed.

FIGS. 5A, 5B, and 5C are directed to indications of sanitization. However, other types of downgrading, such as endorsement may also be used.

There may be instances where a user has modified a sub-program of a larger program, as is typical for updates to a large program. For instance, perhaps the user modifies a method of an object that is used in one sub-program. Instead of performing a security analysis for the entire program, the user could choose to limit the security analysis to that sub-program. FIG. 6 illustrates this concept. FIG. 6 is a logic flow diagram for progressive static security analysis. FIG. 6 illustrates the operation of an exemplary method, a result of execution of computer program instructions embodied on a computer readable memory, and/or functions performed by logic implemented in hardware, in accordance with an exemplary embodiment. Most of the blocks in FIG. 6 have already been described, so only the differences are herein described.

In this example, in block 610, the progressive security analysis tool 170 (e.g., or the static analysis tool 150) allows the user to select one or more sub-programs to analyze, and the program p 107 has multiple sub-programs. The selected sub-programs are assumed to contain modified code. In block 625, the progressive security analysis tool 170 derives the data flow seeds affected by the code changes, taking into account the sub-program(s) selected by the user, in order to create a set of affected data flow seeds 326 that includes the affected data flow seeds for the sub-programs. In block 630, the biasing is adjusted also using the selected one or more sub-programs, such that in block 650 the seeds selected are those affected by the code changes and the selected sub-programs, and in block 655 the seeds selected are those not affected by the code changes but having flows affected by the code changes and not affected by the selected sub-programs. That is, if there are code changes that do not occur in the sub-programs, these code changes are put in block 655. Note that block 655 allows a user to select "known secure" sub-programs and analyze the sub-programs that might not be secure. In block 670, it is determined whether a static security analysis is to be performed using other seeds and other sub-programs. If so, block 375 is performed using seeds for both code changes and the other sub-programs and the seeds corresponding to the original program. Note that the flow in FIG. 6 may also perform an analysis using seeds for both code changes and the other sub-programs but not the seeds corresponding to the original program.

From an implementation perspective, there are existing data-flow analysis frameworks (such as IBM's WALA libraries, which is used by commercial IBM products) featuring data-flow analyses with levels of indirection for controlling the scheduling of propagation steps. Implementing the examples above within such a framework is relatively straightforward.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. A computer readable storage medium does not include a propagating wave.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:
determining modifications have been made to a program;
deriving data flow seeds that are affected by the modifications;
selecting one of the data flow seeds that are affected by the modifications or data flow seeds that are not affected by the modifications but that are part of flows that are affected by the modifications;
performing a security analysis on the program, wherein the security analysis comprises tracking flows emanating from the selected data flow seeds to sinks terminating the flows; and
outputting results of the security analysis, wherein the results comprise one or more indications of security status for one or more of the flows emanating from the selected data flow seeds,
wherein at least the deriving, selecting, and performing are performed using a static analysis of the program.

2. The method of claim 1, wherein:
selecting comprises selecting the data flow seeds that are affected by the modifications;
performing comprises performing the security analysis on the program to track flows emanating from the data flow seeds that are affected by the modifications to sinks terminating the flows; and
outputting further comprises outputting results comprising one or more indications of security status for one or more of the flows emanating from the data flow seeds that are affected by the modifications.

3. The method of claim 2, further comprising, after outputting results of the security analysis:
selecting the data flow seeds that are not affected by the modifications but that are part of flows that are affected by the modifications;
performing the security analysis on the program to track flows emanating from the data flow seeds that are not affected by the modifications but that are part of flows that are affected by the modifications; and
outputting results comprising one or more indications of security status for one or more flows corresponding to the data flow seeds that are not affected by the modifications but that are part of flows that are affected by the modifications.

4. The method of claim 3, further comprising, after outputting results comprising one or more indications of security status for one or more flows corresponding to the data flow seeds that are not affected by the modifications but that are part of flows that are affected by the modifications:
selecting the data flow seeds that are not affected by the modifications and that are not part of flows that are affected by the modifications;
performing the security analysis on the program to track flows emanating from the data flow seeds that are not affected by the modifications and that are not part of flows that are affected by the modifications; and
outputting results comprising one or more indications of security status for one or more flows corresponding to the data flow seeds that are not affected by the modifications and that are not part of flows that are affected by the modifications.

5. The method of claim 1, wherein:
selecting comprises selecting the data flow seeds that are not affected by the modifications but that are part of flows that are affected by the modifications;
performing comprises performing the security analysis on the program to track flows emanating from the data flow seeds that are not affected by the modifications but that are part of flows that are affected by the modifications to sinks terminating the flows; and
outputting further comprises outputting results comprising one or more indications of security status for one or more of the flows emanating from the data flow seeds that are not affected by the modifications but that are part of flows that are affected by the modifications.

6. The method of claim 5, further comprising, prior to determining modifications have been made to the program, performing an initial analysis to the program to determine the data flow seeds that are not affected by the modifications.

7. The method of claim 1, further comprising, performed by a static analysis of the program:
selecting another one of the data flow seeds that are affected by the modifications or data flow seeds that are not affected by the modifications but that are part of flows that are affected by the modifications;
performing a security analysis on the program, wherein the security analysis comprises tracking flows emanating from the selected other data flow seeds to sinks terminating the flows; and
outputting results of the subsequent security analysis, wherein the results comprise one or more indications of security status for one or more of the flows emanating from the selected other data flow seeds.

8. The method of claim 1, wherein each data flow seed corresponds to a statement in the program reading untrusted user input.

9. The method of claim 1, wherein:
the method further comprises allowing a user to select one or more sub-programs of the program, wherein the one or more subprograms comprise modifications to the program; and
selecting further comprises selecting one of the data flow seeds that are affected by the modifications and that are affected by the selected sub-programs or data flow seeds that are not affected by the modifications but that are part of flows that are affected by the modifications and that are not affected by the selected sub-programs.

10. The method of claim 1, wherein selecting one of the data flow seeds that are affected by the modifications or data flow seeds that are not affected by the modifications but that are part of flows that are affected by the modifications further comprises prompting a user to select whether an analysis should be biased in favor of seeds affected by modifications or in favor of seeds not affected by modifications but that are part of flows that are affected by the modifications and, responsive to a user selection, selecting the one of the data flow seeds that are affected by the modifications or the data flow seeds that are not affected by the modifications but that are part of flows that are affected by the modifications.

* * * * *